(12) United States Patent  
Lakshmanan et al.

(10) Patent No.: US 8,346,746 B2  
(45) Date of Patent: Jan. 1, 2013

(54) AGGREGATION, ORGANIZATION AND PROVISION OF PROFESSIONAL AND SOCIAL INFORMATION

(75) Inventors: Geetika Tewari Lakshmanan, Cambridge, MA (US); Martin Oberhofer, Boeglingen (DE)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 12/876,966

(22) Filed: Sep. 7, 2010

(65) Prior Publication Data

US 2012/0059820 A1  Mar. 8, 2012

(51) Int. Cl.  
*G06F 17/30* (2006.01)
(52) U.S. Cl. .................................................. 707/705
(58) Field of Classification Search .................. None  
See application file for complete search history.

(56) References Cited

U.S. PATENT DOCUMENTS 7,720,720 B1 * 5/2010 Sharma et al. ............... 705/26.7  
2009/0077057 A1 * 3/2009 Ducheneaut et al. ............. 707/5

\* cited by examiner

*Primary Examiner* — Baoquoc N To  
(74) *Attorney, Agent, or Firm* — F. Chau & Associates, LLC; William J. Stock, Esq.

(57) ABSTRACT

A method for performing a search for information pertaining to a search subject includes receiving a name of a person. A social/professional value is received. A search is performed based on the received name. A plurality of personal candidates is identified from results of the search and profiles of the same person in different search domains are automatically linked. A search subject is selected from among the identified plurality of candidates based on user input. The search results are characterized along a scale from social information to professional information. The search results are filtered based on the received value indicative of the desired level and the characterization of each item of results found. The filtered search results are displayed.

29 Claims, 8 Drawing Sheets

Social Information
- Flickr photos_Recent trips_Bermuda
- Closest friends on facebook: Mary J, Paco S.
- Aggregated Personal contact info: gy@mail.com (616) 342-1989
- Home location: NY city, NY.
- Major interests: American idol, iPhone, Media Technology
- Link to recent blog posts & tweets: Comcast, Massage Parlor, Asian Restaurant
- Most common blog/twitter posts about: Car, Food, iPhone, Gym
- Most recently added friends: Dan K. -network - mySpace
  Jenny M. - network - facebook
- Recent visits to: Haiti, India, China, NY, Sweden

Professional
- Patents: WWW 2010
- Professional network tree
- Professional Locations: Harvard Univ., Cornell.
- Aggregated Publications - recent ones - WWW 2010.
  ICDCS 2010
- Professional contact info
- Professional memberships: IEEE, ACM
- Most recently added contacts on LinkedIn, co-authors on recent papers and their network

FIG. 6

AGGREGATION, ORGANIZATION AND PROVISION OF PROFESSIONAL AND SOCIAL INFORMATION

BACKGROUND OF THE INVENTION

1. Technical Field

The present disclosure relates to professional and social information and, more specifically, to aggregation, organization and provision of professional and social information.

2. Discussion of Related Art

Data pertaining to the lives of people may be educational, professional, or based on other interests, associations or endeavors, and generally revolves around a particular person or group of people, with a particular emphasis on relationships between people.

Professional information is information pertaining to academics, career and commercial endeavors. Social information is information pertaining to interpersonal relationships, hobbies, interests and non-commercial endeavors in general. Traditionally, information pertaining to people is thought of as either professional or social, with little to no overlap or in-between.

Recently, attention has been focused on social network services. A social network service is a website where users are invited to share information about themselves and establish connections with other users, who may then obtain access to the shared information. These established connections between users form an interlinking network of profiles that has been referred to as the "social graph."

Social network services have undergone extensive proliferation in recent years and today there are a wide variety of social network services. Examples of popular social network services include Facebook, MySpace, LinkedIn, and Google Buzz.

In addition to dedicated social network services, a variety of other websites incorporate aspects of social networking to a niche topic. Examples of such socially aware sites include picture sharing sites Flickr and Razorfish, technology interest sharing sites such as GDGT.COM, and news and story sharing sites such as DIGG.COM. Moreover, content creation platforms such as internet-based discussion forums, groups, chat platforms, and blogs frequently invite users to create public profiles that they may populate with various professional and social information. Moreover, the actual user-created content itself may be thought of as information pertaining to a person.

A variety of other sources exist for professional and social information. These sources may be both online and offline. Examples of other professional and social information sources include public records such as property transfer records and proprietary databases such as credit bureaus. Still other sources of information are tangentially linked or otherwise cross-referenced to particular individuals; examples include intellectual and scientific content sites such as FreePatentsOnline.com, DBLP publications server, ACM author search results, etc.

Ironically, these social network service sites, that have been developed in order to efficiently organize a wide variety of information, have become so numerous and so large that information retrieval across such sources may be disorganized and overwhelming. In response to this disorder, various websites have emerged to organize various sources of social network service information. Examples include FriendFeed.com, Posterous.com, and Google Profile. FriendFeed, for example, allows users to cross-reference their various social network service profiles. Google Profile allows users to cross-reference social network services, FriendFeed profiles, blogs, Twitter account, Flickr accounts, YouTube channels, and more. However, these social information consolidation and aggregation services rely on the user to manually link their various profiles and accounts. Moreover, social information is not integrated across linked accounts.

As users who contribute to these social network services generally wish to make their information broadly available and searchable, it is self-defeating that the large number of available social network services may actually contribute to difficulty in finding desired information. Confusion may result from the fact that a great number of people may share similar or identical names and a given person may have numerous different user profiles across many different platforms and as such it may be nearly impossible to determine which profiles belong to a particular person for whom a user seeks to search for relevant information. Some help may be offered where a person has decided to manually link their various profiles and accounts using one of the available services, however, most often people do not know about or bother to take advantages of these aggregation services, and even those who do may neglect to update this information as needed. Moreover, the fact that there are many available aggregation services means that a searcher must systematically try each service in attempting to obtain access to the desired social information.

SUMMARY

A method for performing a search for information pertaining to a search subject includes receiving a name of a person. A value indicative of a desired level along a scale from social information to professional information is received. A search through one or more information sources is performed based on the received name of the person. A plurality of personal candidates is identified from results of the performed search and profiles of the same person in different search domains are automatically linked. A search subject is selected from among the identified plurality of candidates based on user input. The results of the search that pertain to the selected search subject are characterized along a scale from social information to professional information based on a nature of the information source from which each item of the results is found. The results of the search that pertain to the selected search subject are filtered based on the received value indicative of the desired level along the scale from social information to professional information and the characterization of each item of results found. The filtered search results are displayed.

A method for performing a search for information pertaining to a search subject includes receiving a name of a person, receiving a value indicative of a desired level along a scale from social information to professional information, performing a search through one or more information sources based on the received name of the person, identifying a plurality of personal candidates from results of the performed search and automatically linking profiles of the same person in different search domains, selecting a search subject from among the identified plurality of candidates based on user input, characterizing the results of the search that pertain to the selected search subject along a scale from social information to professional information based on a context in which each item of search results is found within wherein a nature of the context is classified by ontological analysis, filtering the results of the search that pertain to the selected search subject based on the received value indicative of the desired level along the scale from social information to professional information and the characterization of each item of results found, and displaying the filtered search results.

A method for performing a search for information pertaining to a search subject includes characterizing each of a plurality of information sources along a scale from social information to professional information, receiving a name of a person, receiving a value indicative of a desired level along a scale from social information to professional information, performing a search through the plurality of information sources based on the received name of the person, identifying a plurality of personal candidates from results of the performed search and automatically linking profiles of the same person in different search domains, selecting a search subject from among the identified plurality of candidates based on user input, characterizing the results of the search that pertain to the selected search subject along a scale from social information to professional information based the characterization of the information source that each item of search results is found within, filtering the results of the search that pertain to the selected search subject based on the received value indicative of the desired level along the scale from social information to professional information and the characterization of the search results, and displaying the filtered search results.

A system for performing a search for information pertaining to a search subject includes a crawler server for crawling one or more information sources for information pertaining to one or more search subject and assigning each found item of information a serial number representing a particular search subject and value that is indicative of how social and how professional the item of information is, an information database for storing each item of information along with its corresponding search subject serial number and value, and a web server for providing a search interface for allowing a user to perform a search for information pertaining to a desired search subject from among the information stored in the information database. The search results from the user's search are filtered according to the value of each item of information and a value indicative of a desired level along a scale from social information to professional information provided by the user.

A computer program product for performing a search for information pertaining to a search subject, said computer program product includes a computer readable storage medium, program instructions for receiving a name of a person, program instructions for receiving a value indicative of a desired level along a scale from social information to professional information, program instructions for performing a search for the received name using an information database storing items of information crawled from one or more information sources along with corresponding search subject name data and value that is indicative of how social and how professional the item of information is, program instructions for identifying a plurality of personal candidates from results of the performed search, program instructions for selecting a person of interest from among the identified plurality of candidates based on user input, program instructions for filtering the results of the search that pertain to the selected search subject based on the received value indicative of the desired level along the scale from social information to professional information, and program instructions for displaying the filtered search results. The program instructions are stored on said computer readable storage medium.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 6 is an illustration of a consolidated information page for a personal candidate according to an exemplary embodiment of the present invention;

DETAILED DESCRIPTION OF THE DRAWINGS

Figure 1:
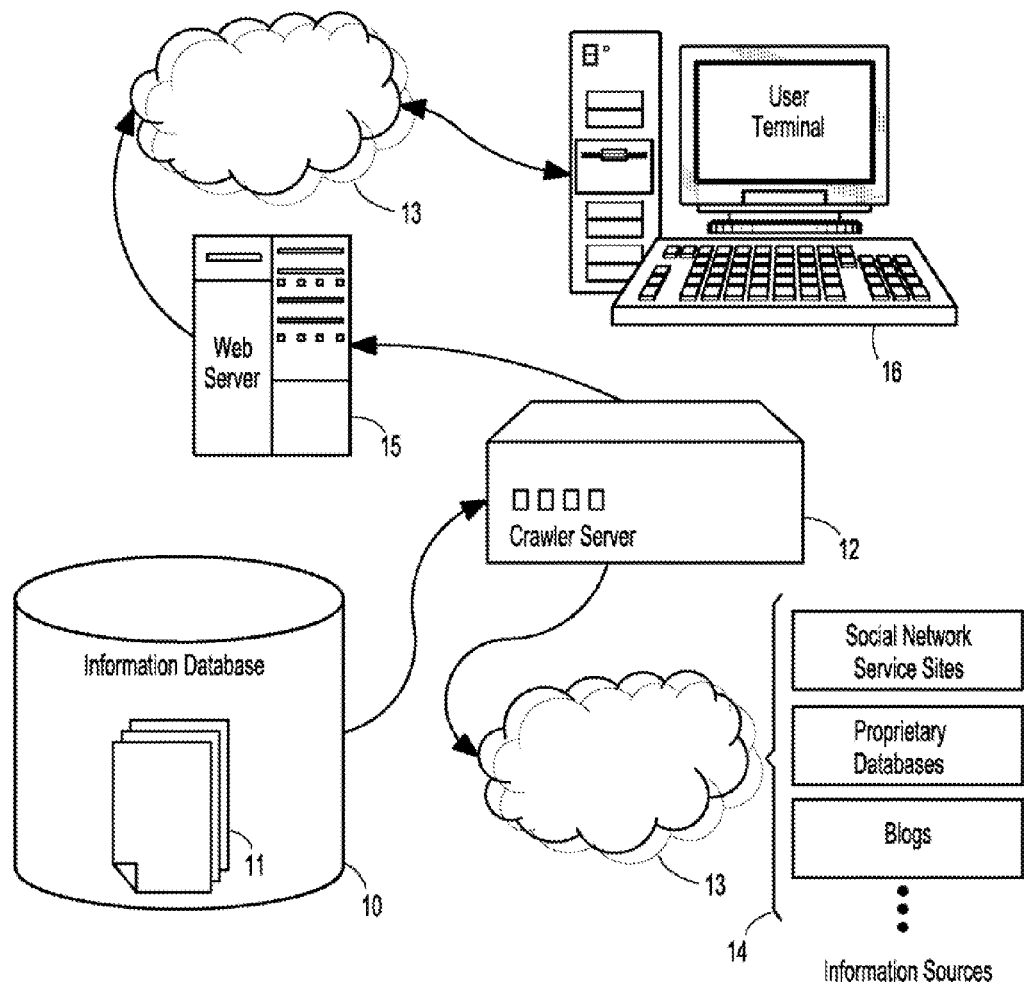
FIG. 1 is an illustration of a system for collecting and storing the prearranged information according to an exemplary embodiment of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention relate to a system and method for the aggregation, organization, and provision of information pertaining to a person. Accordingly, using the systems and approaches discussed in detail herein, users may be able to effectively access information pertaining to a person aggregated across multiple sources without reliance upon individuals maintaining listings of linked social network services and related sources of social information. Moreover, exemplary embodiments of the present invention utilize an intelligent characterization of information pertaining to a person.

While conventional thinking tends to group information pertaining to a person as either social (i.e. not suitable for business purposes) or professional (i.e. directed towards business purposes), exemplary embodiments of the present invention contemplate a continuum of characterization where an individual piece of information may be characterized as completely social, completely professional, both social and professional, or somewhere in-between social and professional. By contemplating information pertaining to a person in this manner, exemplary embodiments of the present invention may be able to tailor aggregation, organization and presentation of information pertaining to a person to the specific requirements of a user. Accordingly, users may have the ability to focus their search on the type of information desired.

Moreover, exemplary embodiments of the present invention may provide for a novel approach to isolating information pertaining to a person for a particular search subject and filtering out information associated with other people, even those having similar or identical names.

Collected information may then be efficiently organized and displayed and the display of information may be persistently updated with most interesting updates being automatically surfaced. Accordingly, using the systems and approaches described in detail herein, a searcher may quickly and easily obtain desired information pertaining to a person with a high level of organization and minimal information confusion.

Exemplary embodiments of the present invention permit a user to conduct a search for a particular search subject. By making use of prearranged information that was collected and aggregated, for example, by crawling various social network service websites and various other proprietary and open databases, information about the search subject may be gathered and presented to the searcher, for example, in the form of a search result profile in which a large amount of information is intuitively arranged. The searcher may then navigate the profile to obtain desired informational details. The search result profile, rather than disappearing after use, may be automatically updated and the searcher may return to the desired search result profile at a later time. This feature may be enabled, for example, by storing the search result profile to local storage. The user may also be presented with a news feed including pertinent updates to search result profiles that have been previously presented to the searcher. Updates may be ranked and displayed in order of likely importance, as automatically determined.

By repeated use, the searcher may thereby utilize a set of search result profiles for multiple search subjects and may receive periodic or continuous updates so that these search subjects may be more easily followed. While existing social network services such as Facebook may present a user with a news feed of established friends, exemplary embodiments of the present invention may be used to allow the searcher to receive search result profiles and updates for various persons of interest using data collected across multiple sources, regardless of whether the searcher is a registered user of a social network service used by the persons of interest, regardless of whether the searcher has a formal social connection to the persons of interest, and regardless of where the search subject choose to exhibit their pertinent social information and other content and information. Accordingly, while existing social network services may permit users to update their information profiles and may then push these updates to other users with established relationships, exemplary embodiments of the present invention may permit a searcher to perform an active search for desired information pertaining to a search subject.

As described above, exemplary embodiments of the present invention may utilize prearranged information that was collected and aggregated, for example, by crawling various social network service websites and various other proprietary and open databases. FIG. 1 is an illustration of a system for collecting and storing the prearranged information according to an exemplary embodiment of the present invention. The prearranged information may be maintained in an information database 10 that may be organized by search subject. For example, each search subject may be assigned a unique serial number and there may be a single database entry 11 for each search subject within the information database. Various approaches for automatic assignment of unique serial numbers are discussed in detail below. A data aggregation server, for example, a crawler server 12, may then crawl through one or more websites containing information pertaining to a person 14 via the Internet 13. These websites 14 may include any websites that may contain information about people, either social or professional. Examples of suitable websites include social network services such as Facebook, MySpace, LinkedIn, and Google Buzz; socially aware sites include picture sharing sites Flickr and Razorfish; interest sharing sites; social news sites; content creation and discussion sites such as blogs, forums, news groups and online groups; intellectual and scientific content sites such as FreePatentsOnline.com; DBLP publications server; ACM author search results, etc.

Crawling of the various websites 14 may be performed by identifying personal candidates, which may be clusters of information believed to pertain to a single person. Each personal candidate may be assigned a unique serial number and various information obtained about that personal candidate may be stored as a database entry 11 within the information database 10. Information obtained about the personal candidate may include textual information however other forms of information may be obtained as well. Examples of other forms of information may include pictures, PDFs, document files and other forms of multimedia.

An iterative process of combining and splitting personal candidates may be performed. Combining of personal candidates may occur when sufficient information is found to be similar or identical for multiple personal candidates, even when other information is found to be different. For example, personal candidate creation may begin with a name. When a name is encountered, for example, by cross-referencing data against a name database, a first personal candidate serial number may be assigned. Then, when a different name is encountered, a second personal candidate serial number is assigned. A determination may then be made as to a likelihood of the second name representing the first person. For example, if the first person is named "Robert Jones" and the second person is named "Bob Jones" a database of likely name correspondences may be consulted to determine that the names may represent the same person. Similarly, an assumption may be made that either first names, last names or sometimes both names may change. Accordingly, various logical rules and/or heuristics may be used to determine when two personal candidates should be combined. For example, a uniqueness value may be calculated for each personal candidate with and when two personal candidates have uniqueness values that are sufficiently close, the personal candidates may be merged.

Splitting may occur when two personal candidates, originally appearing to be identical, for example, due to having a similar or identical name, are later determined to be sufficiently dissimilar. Splitting may occur, for example, once a sufficient threshold of contradictory information is obtained. There may be a threshold for contradictory information to allow for incorrect or incomplete data or unlikely data incongruities. For example, information may be identified that a person names "Vanessa Kim" has attended two distinct high schools. This information alone may be insufficient to split the personal candidate. However, if other incongruities are discovered such as occupations in different industries or distinct email addresses, eventually sufficient incongruity may be established to split the personal candidate into two or more distinct candidates, even when each individual incongruity may be insufficient to warrant a split.

As personal candidate generation may be iteratively performed, it may be possible for a single personal candidate to be split multiple times and for previously split candidates to be recombined. This is because as more information is obtained, for example, via web crawling, determinations may be iterated. Prior knowledge may be used to assist in personal candidate generation and splitting. For example, it may be understood that the last names, particularly those of females, may change and that common names are more likely to represent multiple people than uncommon names. This prior knowledge may be embodied, for example, as a set of logical rules.

Figure 3:
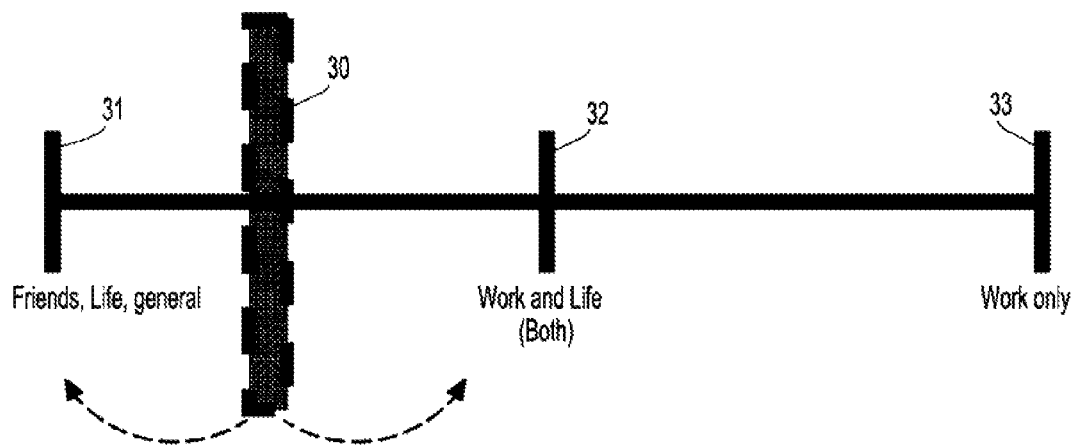
FIG. 3 illustrates an exemplary user interface (UI) element for facilitating searcher characterization of desired information according to an exemplary embodiment of the present invention.

One or more web servers 15 may be used to host a website that permits searchers to perform a search for information pertaining to a person according to exemplary embodiments of the present invention. Searcher may access the web servers 15 from a user terminal 16 with an Internet connection and running a web browser. In performing the search, the searcher may enter the name and/or additional information pertaining to the search subject, which as used herein, designates the subject of the search. The searcher may also be provided with an opportunity to characterize the type of information they are most interested in acquiring. FIG. 3 illustrates an exemplary user interface (UI) element for facilitating the searcher to characterize the desired information. As shown in FIG. 3, the searcher is provided with a slider bar 30 that the searcher may move either right or left. By sliding the slider 30, the searcher can pictorially represent the degree to which the desired information is social in nature or professional in nature. In the example shown, sliding the slider 30 to the left-most location 31 indicates the searcher's desire to acquire information that is entirely social in nature whereas sliding the slider 30 to the right-most location 33 indicates the searcher's desire to acquire information that is entirely professional in nature. Similarly, positioning the slider to the middle location 32 indicates the searcher's desire to acquire both social and professional information.

By characterizing the nature of the desired information, the searcher may be able to customize search results according to a search objective. For example, a searcher may be interested in focusing their search to professional information and the searcher may not be interested in obtaining social information. Another searcher, however, may be interested in focusing their search only to social information and thus may only be interested in information such as that available from social networking sites, photo sharing sites, and personal blog sites. By manipulating the slider bar, or otherwise setting the search character preference, searchers may utilize exemplary embodiments of the present invention to focus search results as desired.

As described above, crawled data may be characterized according to a degree of social character and a degree of professional character. More specifically, when information pertaining to a person is discovered, a set of rules and/or heuristic analysis may assign a social/professional score to each datum. In determining the social/professional score, it may be assumed that information may span a range from purely social, such as a person's favorite song, to purely professional, such as a person's number of years of experience as a software engineer. However, information such as the university a person attended may be both social and professional.

Determination as to social/professional score may also be dependent upon an industry or occupation of the search subject, where such information is available. For example, political affiliation may be social information for the software engineer but may be professional for a politician. Where profession and/or industry is know, such information may contribute to the rules and/or heuristics used to determine social/professional score.

While any scale may be used, exemplary embodiments of the present invention may use a scale from −1, indicating purely social information, to +1, indicating purely professional information. A score of zero may indicate that the information is both social and professional and/or the social/professional character of the information can not be determined. A similar score may be input by the searcher, for example, by the movement of the slider 30. The score input by the searcher may then serve as a threshold for filtering out search results information pertaining to the search subject. For example, if the searcher slides the slider 30 three quarters of the way to the left side 31 with respect to the center position 32, the searcher will have input a social/professional score of −¾. If the searcher slides the slider 30 half way between the right side 33 and the center 32 then the searcher will have input a social/professional score of +½.

Figure 4:
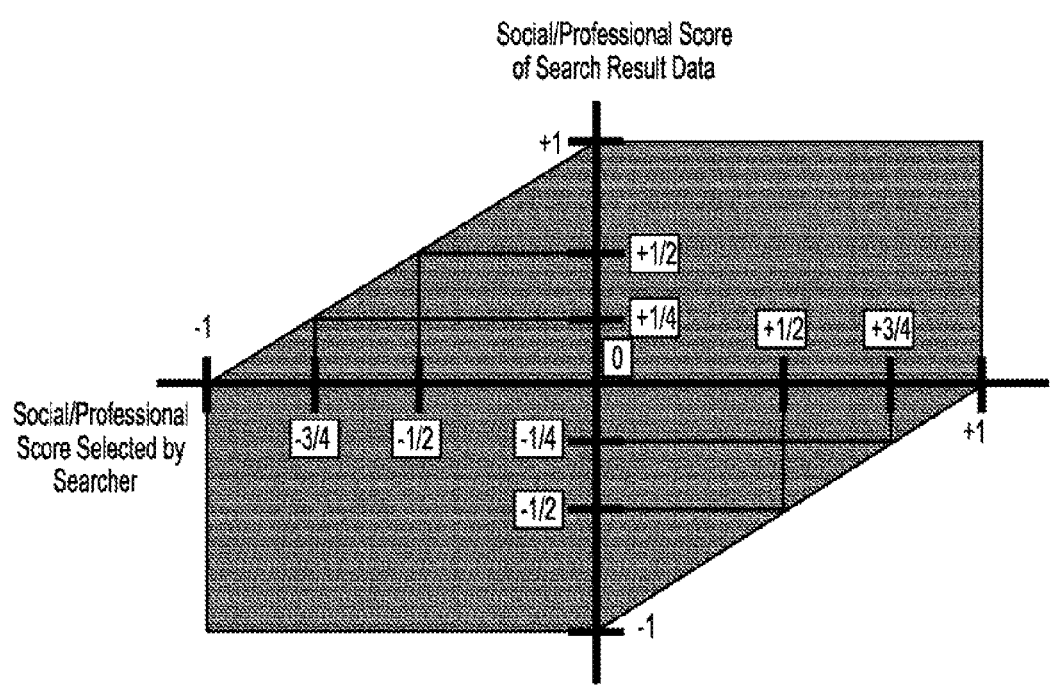
FIG. 4 is a graph illustrating an approach for filtering search results based on a social/professional score selected by a searcher and the social/professional scores of the search result data in accordance with exemplary embodiments of the present invention.

Accordingly, when a search is performed based on the search subject, results may be filtered based on the social/professional score selected by the searcher and the social/professional scores of the search result data. For example, according to one filtration approach illustrated in the graph of FIG. 4, when the searcher selects a social/professional score approximately equal to −1 indicating a desire to obtain only social information, all data having a social/professional score of between 0 and −1 may be returned. Similarly, when the searcher selects a social/professional score approximately equal to +1 indicating a desire to obtain only professional information, all data having a social/professional score of between 0 and +1 may be returned. When a searcher selects a social/professional score approximately equal to 0 indicating a desire to obtain both social and professional information, all data (defined from −1 to +1) may be returned. Moreover, when the searcher selects a social/professional score that is between −1 and 0 indicating a desire to obtain social information and some degree of professional information as well, all data having a social/professional score of between 0 and 1 is returned along with a portion of results within the range of 0 and −1, for example, as illustrated in detail in FIG. 4.

As described above, a single search may generate results for multiple personal candidates. After the iterative process of combining and splitting has resulted in a final set of personal candidates, exemplary embodiments of the present invention seek to provide a novel UI for facilitating searcher identification of a desired search subject from among the available personal candidates.

Figure 5:
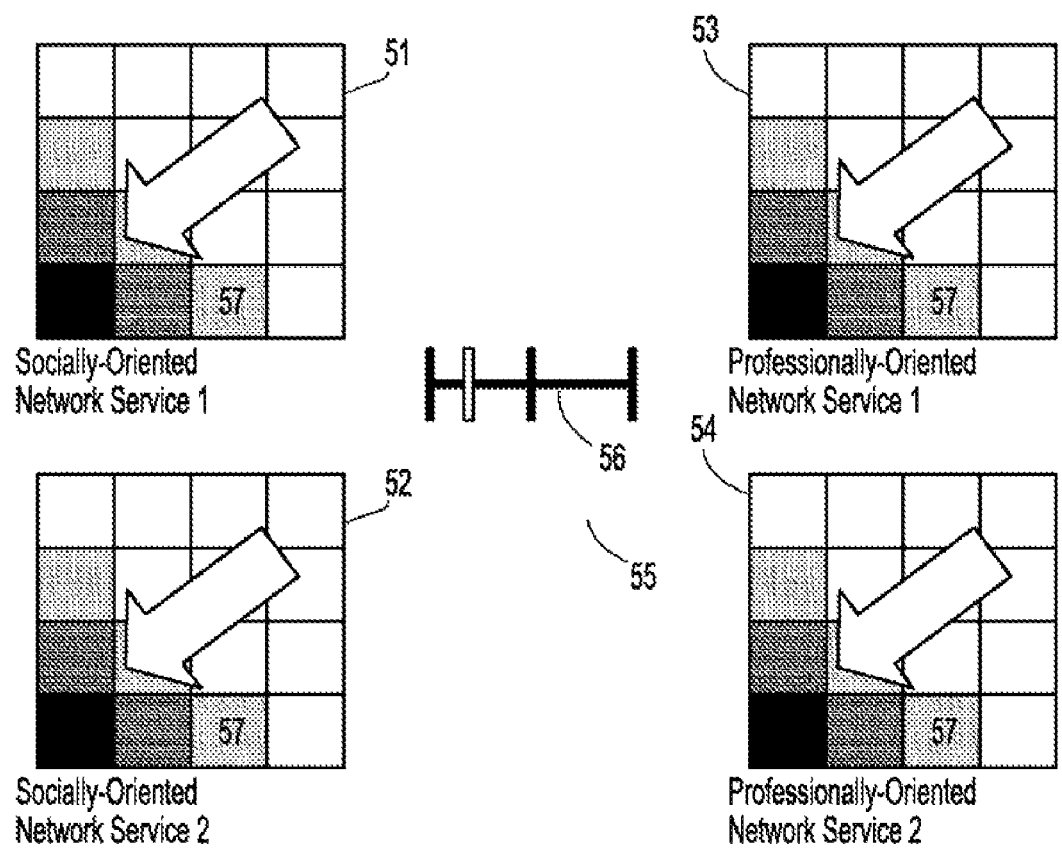
FIG. 5 is an illustration showing a personal candidate UI according to an exemplary embodiment of the present invention.

FIG. 5 is an illustration showing a personal candidate UI according to an exemplary embodiment of the present invention. As discussed above, the crawler server 12 may search and discover data pertinent to personal candidates from a plurality of information sources 14 such as social networking service sites. Upon completion of a search, exemplary embodiments of the present invention may identify a plurality of personal candidates and the searcher may be consulted to select a final candidate. For example, a group of n closest matching candidates (where n is a positive integer) may be displayed to the user along with sufficient information to allow the searcher to determine which candidate represents the search subject. In so doing, one or more of the information sources that information pertaining to a person has been found within, may be represented as matrices 51-54 on a display. Each matrix 51-54 may represent a different information source 14. For example, matrix 51 may represent a first socially-oriented network service, matrix 52 may represent a second socially-oriented network service, matrix 53 may represent a first professionally-oriented network service, and matrix 55 may represent a second professionally-oriented network service. A selection bar 56 may be presented to the searcher so that the searcher may select from among the assortment of information sources used in gathering search results. The selection bar may be similar to the selection UI element described above with respect to FIG. 3. However here, rather than influencing search criteria and/or results, the selection bar 56 may be used to select which of the information sources to display matrices for on the display screen. The selection bar 56 need not be a horizontal slider, it may be a 360° pointer that the searcher may rotate either clockwise or counter clockwise to wade though all of the available matrices.

When the searcher is satisfied with the displayed matrices, the searcher may then use the displayed matrices to select the desired search subject from among the available personal candidates. For each matrix 51-54, there are a plurality of boxes arranged in rows and columns. For a given matrix, the boxes each represent a different personal candidate. The boxes are ordered and/or color coded in accordance with the calculated match quality. For example, as shown in FIG. 5, best matches are arranged from the lower left of each matrix to the upper right, with darker boxes representing better matches. The arrangement of personal candidate boxes may be identical across all matrices 51-54 such that corresponding boxes represent the same personal candidate in each of the matrices. For example, box 57, which is located in the third column from the left and fourth row from the top, may represent the same personal candidate in each of the matrices 51-54.

The user may then select a desired box from among any of the available matrices 51-54, switching the displayed matrices using the slider 56 where desired, to be shown data from the corresponding information source for the corresponding personal candidate so that the searcher may get a good idea for whether the personal candidate is corresponds to the desired search subject. For example, where the searcher selects the box 57 from the first professional network service matrix 53, the searcher may be presented with the information pertaining to personal candidate 57 from within the first professional network. Where the first professional network service represents LinkedIn, by selecting box 57 within the matrix 53, the searcher may be presented with information from LinkedIn relating to personal candidate 57. For example, the searcher may be presented with personal candidate 57's LinkedIn profile page. The searcher may use this information to determine whether personal candidate 57 corresponds to the search subject. If it does not then the searcher may try other personal candidates. Upon finding the desired personal candidate, the searcher may indicate this finding to the system, for example, by a double click of a mouse or some other input operation.

Upon selecting a search subject from among the available personal candidates, the searcher may be presented with a consolidated information page corresponding to the selected search subject. The consolidated information page may integrate information about a particular search subject to provide a single view of information including both text and pictures. FIG. 6 is an illustration of a consolidated information page for a candidate of interest according to an exemplary embodiment of the present invention. On this page, information obtained form across the diverse set of information sources may be reconciled and displayed together.

As discussed above, information may be acquired from such information sources as social networking sites (e.g. Twitter, Facebook, MySpace, and LinkedIn), blogs (e.g. blogger.com), picture sharing sites (e.g. Flickr and Razorfish), and intellectual and scientific content sites (e.g. United States Patent and Trademark Office search website, FreePatentsOnline.com, DBLP Publication server, ACM author search results).

As large amounts of information may be acquired and displayed, the consolidated information page may allow for hierarchical arrangement of information where the searcher may drill down to display additional details. Thus exemplary embodiments of the present invention may synthesize, categorize, and display information in an expandable manner. Information display may also be customized by the searcher as desired.

Reconciliation of the information may include identifying when an item of information is the same across multiple information sources and then displaying this information only once instead of once for each information source that the information appears in. Reconciliation may also include resolving differences in information obtained from different sources. This may be performed, for example, by automatically parsing the information acquired from the multiple information sources to determine a proper context and when there are multiple different entries associated with a similar or identical context, the consolidated information page may display either each of the multiple different entries or determine which has a preferred priority, for example, by determining the date that the information was modified and/or added. Most recent data may then be displayed over older data. Moreover, certain information sources may be of a higher priority as they may be more likely than other information sources to provide accurate and/or up-to-date information.

Proper context may be discovered, for example, using ontology to match words that are similar and related but are not the same. Using ontology, exemplary embodiments of the present invention may conduct a match for context that goes beyond simple string match by performing matching algorithms using ontology information.

In addition to or in place of characterizing search results, information source may be characterized along the scale from social to professional information and characterization of the information sources may be used to characterize the search results. Information sores may have a known characterization, for example, having been predetermined. Other information sources, for example, new information sources, may be characterized by assessing a degree of similarity to known information sources and/or by provided user input. The degree of similarity may be assessed, for example, using ontological methods such as string matching and/or by heuristic approaches.

A list of information sources searched may be kept in a local memory and this list may be updated, for example, in a background process based on criteria such as upon the occurrence of change, at predetermined intervals, and/or at the request of a user.

Figure 7:
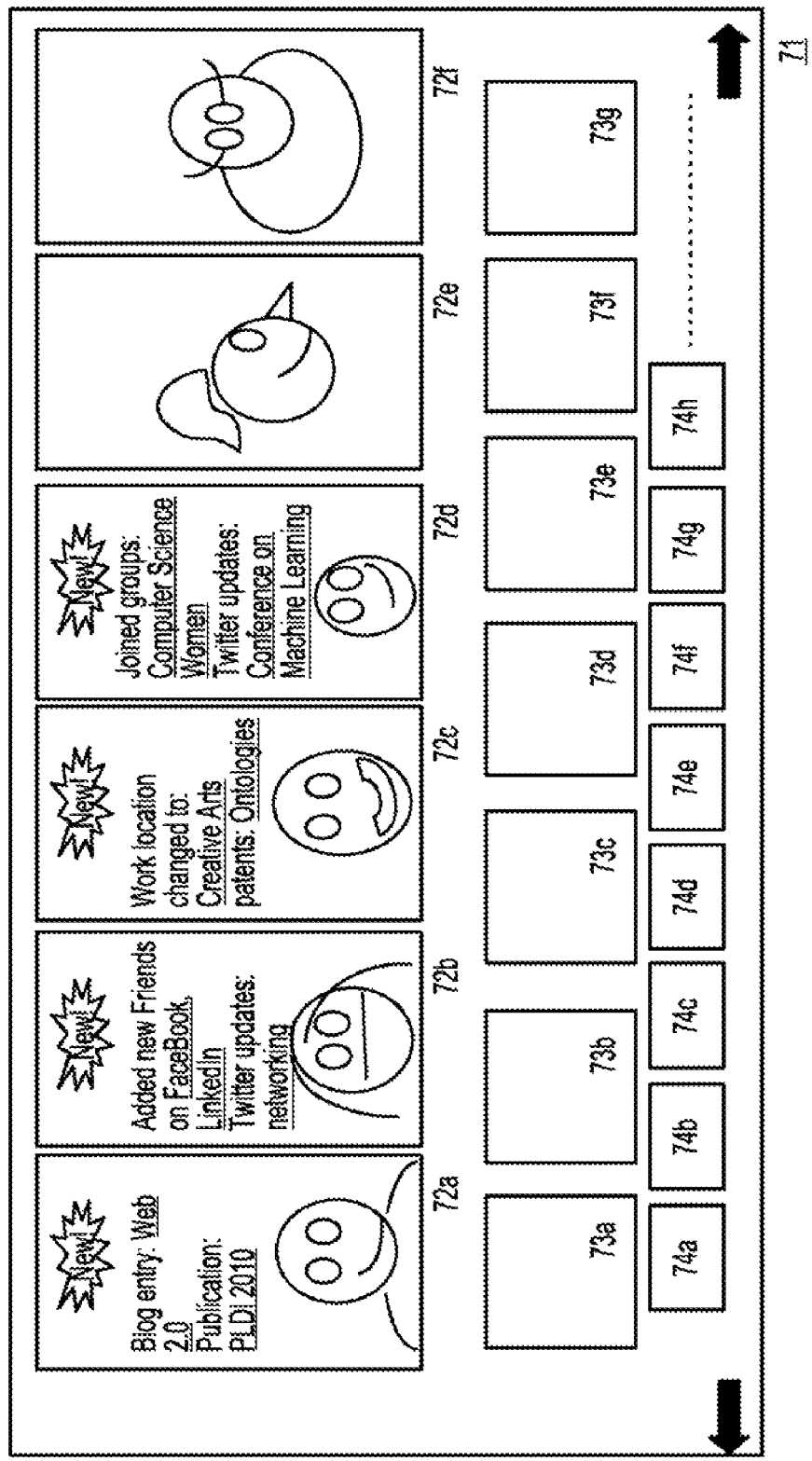
FIG. 7 is an illustration of an information update page according to an exemplary embodiment of the present invention.

Exemplary embodiments of the present invention may also provide for periodic, continuous, and/or searcher-initiated updates for information pertaining to previously searched search subjects. Accordingly, a searcher may subscribe to receive updates on particular search subjects. The searcher may automatically be subscribed to each person that they perform a search for or the searcher may choose to subscribe to particular search subjects. The searcher may be presented with an information update page displaying recent changes to available information pertaining to subscribed-for search subjects. Updates may be generated, for example, by automatically repeating previous searches, for example, at predetermined intervals, and identifying recently updated information by comparing new search results to results of a prior search. FIG. 7 is an illustration of an information update page according to an exemplary embodiment of the present invention.

As can be seen in FIG. 7, an information update UI element 71 may be provided to display a plurality of information update blocks 72, 73, and 74. Information blocks may be displayed by groups. Each group may include information update blocks of similar prominence. Blocks of greater prominence may, for example, be displayed in larger form. For example, a first group of information blocks 72 including blocks 72a-72f may be displayed in a top row in relatively large form. A second group of information blocks 73 including blocks 73a-73g may be displayed on a middle row in medium form. A third group of information blocks 74 including blocks 74a-74h may be displayed in a bottom row in relatively small form. There may be back and forward facing buttons made available to the searcher to wade through additional update blocks, as desired.

The larger the form of the update block, the more information may be displayed on the block. Accordingly, information blocks of the greatest prominence may include the greatest amount of information. For example, information blocks 72a-72f may include a photograph of the corresponding search subject, where available. Updated information may be displayed along with information that may not have necessarily been updated in order to provide appropriate context. For example, name information may always be displayed. Updated information may be displayed either directly within the information block or a link to the information may be included in the block. Information block size constraints may be used to determine whether to place the information directly within the information box or link to the information.

Information may be displayed in information blocks, for example, as bullet-based text, paragraph text, pictures, and/or videos. Information may be presented in an expandable and collapsible hierarchy of views that allows for the searcher to drill down and view detailed information about the search subject.

Information blocks that have been recently updated may be marked as such. Information blocks that have not recently been updated may still be displayed within the information update UI 71. For example, the information update UI 71 may include information blocks for all search subjects for whom the searcher has subscribed to receive updates on regardless of the length of time since information associated with that search subject has changed. The searcher may have the option to unsubscribe to stop receiving updates from a particular search subject and upon unsubscription, the corresponding information block may be removed from the information update UI. The subscriber may also select to receive alerts when updates are available, for example, via email, text message or by other means. According to one exemplary embodiment of the present invention, the searcher may select to have updated information blocks sent directly to their mobile phone by multimedia messaging service (MMS), which can support the sending both textual information as well as pictures.

As discussed above, the searcher may be able to customize the display of information. For example, the searcher may modify the information update UI to specify aspects of the relationship between the user and the search subject that the searcher may be interested in.

The searcher, after performing searches, may then refer back to a search subject's profile once the system has identified the correct person. The searcher may then review details for the desired search subject in one page without having to visit all of the various information sources on the interne such as social networking sites, media sharing sites, etc.

Figure 2:
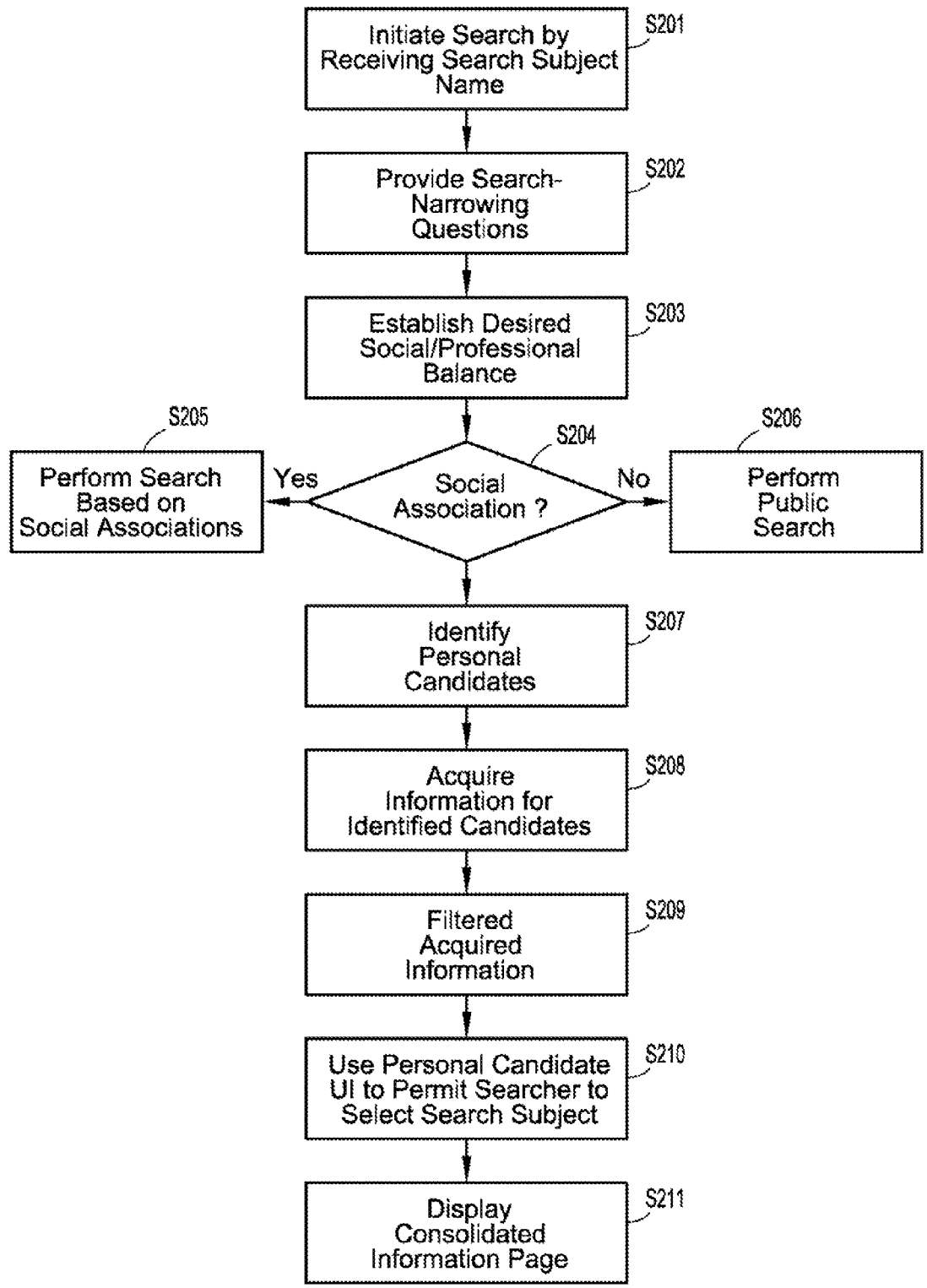
FIG. 2 is a flow chart illustrating an approach for performing an information search and displaying search results according to an exemplary embodiment of the present invention.

Exemplary embodiments of the present invention may provide multiple different approaches for performing the search as generating the information display discussed in detail above. FIG. 2 is a flow chart illustrating an approach for performing an information search and displaying search results according to an exemplary embodiment of the present invention. First, a searcher may begin a search by entering in a name of a search subject (Step S201). Then, the search may be narrowed by presenting the searcher with a set of simple questions in which the answers to earlier questions may affect which questions are asked at a later point (Step S202). Examples of suitable questions may be to ask the searcher to provide the approximate age of the search subject, for example, by soliciting a multiple choice selection between age ranges such as 0-18 years old, 19-30 years old, 31-50 years old, and 51 years old and older. The searcher may be asked to provide information as to from where the person is known, e.g. high school, college, graduate school, work, socially, etc. The searcher may be asked to provide the gender of the search subject. The searcher may be asked to provide one or more keywords for various categories of information. Categories of information may include interests, profession, subject, location, etc. Exemplary keywords may include poker, lawyer, criminal law, Boston, respectively. The searcher may also be asked to select from various information sources either for the purposes of selecting which sources to use or which sources to refrain from using. There may be a default selection which may include, for example, Facebook, LinkedIn, Flickr, Posterous, Twitter, Blogger, and MySpace. The provided information may then be used to generate a hashmap (key, value) of pairs that may be used in performing the search.

As described above with respect to FIG. 3, the searcher may be provided with the opportunity to establish the desired balance of social/professional information (Step S203). The searcher may indicate that they are interested in only professional information, only social information, all information, or intermediate information including, for example, all professional information as well as professional-leaning social information. Alternatively, the searcher may indicate that they are interested in all social information as well as social-leaning professional information. Such selections may be possible as exemplary embodiments of the present invention may characterize search results along a continuous social/professional scale, for example, as described in detail above.

The searcher may be asked whether the search subject is socially associated with the searcher (Step S204). Social association, as used herein, refers to a formalized relationship within one or more of the social network service information sources. These relationships may be referred to as "friends" or "fans" in the context of Facebook or "followers" in the context of Twitter, however, other social associations may exist for other information sources. This information may be used to limit the search field to personal candidates with social associations and/or to take advantage of the fact that social associations may be used to grant the searcher access to information pertaining to a person not made publicly available. In the latter case, the searcher may be provided with the opportunity to input their social network account credentials so that the automated search may use these credentials to gain access to the additional information. Here, application programming interfaces (APIs) of the various social network services may be used to log into the respective websites and search for the name of the person the searcher is looking for among the searcher's friend list. This search may be performed for each social network or other information source that the searcher has identified as being registered to and has provided appropriate credentials for.

Search may then be performed while limiting the field of search based on the acquired information. Where social associations are present (Yes, Step S204), search may be performed by directly interfacing with the appropriate information sources where the social associations exist (Step S205). Where no social associations are present (Step S204), public search may be performed externally, for example, using existing search engines such as Google or Bing or by handling search internally, for example, using the web crawling server (Step S206). Where used, the search based on social association (Step S205) may be followed by the public search (Step S206) to obtain additional information pertaining to a person.

Personal candidates may be identified (Step S207), for example, using an iterative process of combining and splitting as described above. For each identified candidate, pertinent information may be acquired (Step S208). The acquired information may then be filtered in accordance with the searcher's social/professional selection (Step S209). The searcher may then be presented with a personal candidate UI, as described above with respect to FIG. 4, and the searcher may use the personal candidate UI to select a desired search subject from among a set of n closest-matches (Step S210).

The searcher may then be presented with a consolidated information page for the selected candidate of interest, as described in detail above with respect to FIG. 6 (Step S211). The searcher may use the consolidated information page to review the acquired information that has been filtered in accordance with social/processional preference.

Where desired, the searcher may have the search results added to an information update page, as described above with respect to FIG. 7, so that the searcher may return to past search results and/or receive update alerts, where desired.

Figure 8:
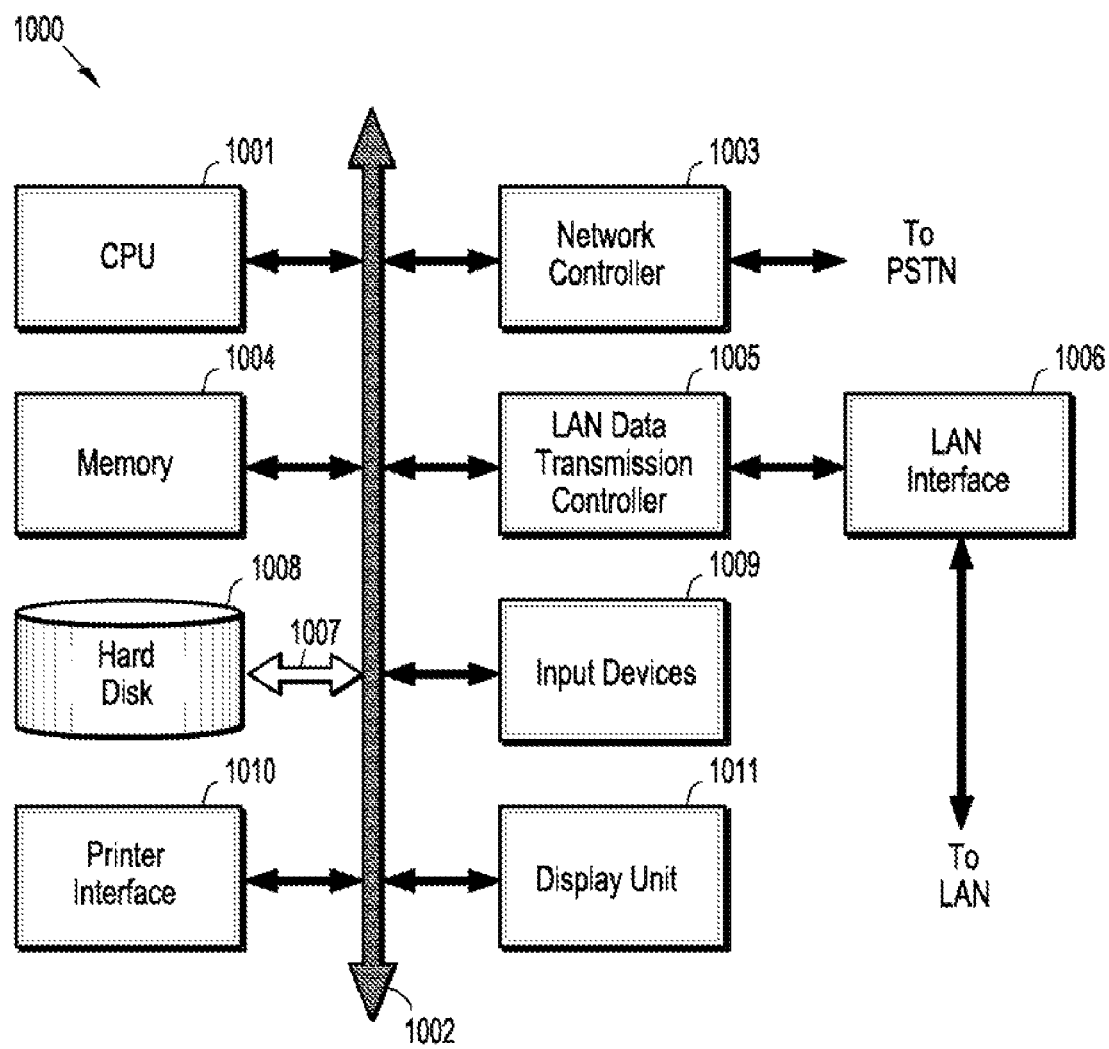
FIG. 8 shows an example of a computer system capable of implementing the method and apparatus according to embodiments of the present disclosure.

FIG. 8 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a non-transitory computer readable storage medium locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for performing a search for information pertaining to a search subject, comprising:

receiving a name of a person;

receiving a value indicative of a desired level along a scale from social information to professional information;

performing a search through one or more information sources based on the received name of the person;

identifying a plurality of personal candidates from results of the performed search and automatically linking profiles of the same person in different search domains;

selecting a search subject from among the identified plurality of candidates based on user input;

characterizing the results of the search that pertain to the selected search subject along a scale from social information to professional information based on a nature of the information source from which each item of the results is found, said nature of the information source being determined by string comparison against a lexicon;

filtering the results of the search that pertain to the selected search subject based on the received value indicative of the desired level along the scale from social information to professional information and the characterization of each item of results found; and displaying the filtered search results.

2. The method of claim 1, wherein characterizing the search results based on the nature of the information source includes determining the nature of the information source by performing an ontological comparison between each information source and information sources of known character.

3. The method of claim 1, wherein the characterization of the results of the search is performed with user-input.

4. The method of claim 1, wherein each item of information from the results of the search is automatically linked to a corresponding identified personal candidate.

5. The method of claim 1, wherein search the results of the search are characterized according to a domain name associated with the information source from which the results were found and providing a user with an opportunity to reject a particular domain name as a method for eliminating one or more false candidates.

6. The method of claim 5, wherein user rejected domain names are additionally used to filter results of the search by filtering out information that corresponds to information found within user rejected domain names.

7. The method of claim 1, wherein the filtered results of the search that pertain to the selected search subject are ranked prior to display and the displaying of the filtered and ranked search results is performed in a concise summarized and aggregated manner and the received value indicative of a desired level along a scale from social information to professional information is used as a ranking criterion.

8. The method of claim 1, further comprising, updating the filtered search results periodically, on the initiation of a user, or as new search results are available and displaying the updated filtered search results along with updated filtered search results pertaining to previous searches on a single user interface screen.

9. The method of claim 8, wherein the updated filtered search results are ranked prior to display and the displaying of the filtered and ranked search results is performed in a concise summarized and aggregated manner.

10. The method of claim 1, wherein the value indicative of a desired level along a scale from social information to professional information is provided by a user by adjusting a user interface element.

11. The method of claim 1, wherein the selecting of a search subject from among the identified plurality of candidates based on user input comprises displaying a plurality of matrices, each matrix representing one of the information sources, wherein each of the matrices includes a grid of icons, each icon representing a candidate of the plurality of candidates, wherein each icon is used by the user to display information about the corresponding candidate from the corresponding source of search information, and wherein the user selects a search subject by selecting an icon from one of the matrices.

12. The method of claim 1, wherein the one or more information sources include social network service websites, proprietary databases, blogs, papers database, patents database, or twitter feeds.

13. The method of claim 1, wherein filtering the search results pertaining to the selected search subject based on the received value indicative of the desired level along the scale from social information to professional information, comprises assigning items of information within the results of the search pertaining to the selected search subject a value indicative of how social and how professional the item of information is and filtering each item of information according to its assigned value and the received value indicative of the desired level along the scale from social information to professional information.

14. The method of claim 1, additionally comprising:
receiving login credentials from a user;
logging into one or more sources of information using the received credentials; and
performing the search through the one or more sources of the information while logged in.

15. The method of claim 1, wherein identifying a plurality of personal candidates from results of the performed search comprises performing an iterative process of combining and splitting candidates.

16. A method for performing a search for information pertaining to a search subject, comprising:
receiving a name of a person;
receiving a value indicative of a desired level along a scale from social information to professional information;
performing a search through one or more information sources based on the received name of the person;
identifying a plurality of personal candidates from results of the performed search and automatically linking profiles of the same person in different search domains;
selecting a search subject from among the identified plurality of candidates based on user input;
characterizing the results of the search that pertain to the selected search subject along a scale from social information to professional information based on a context in which each item of search results is found within, wherein a nature of the context is classified by ontological analysis;
filtering the results of the search that pertain to the selected search subject based on the received value indicative of the desired level along the scale from social information to professional information and the characterization of each item of results found; and
displaying the filtered search results.

17. The method of claim 16, wherein the results of the search include structured information and the characterization of the results of the search are based on the structure of the information.

18. The method of claim 16, wherein the results of the search include unstructured information and the characterization of the results of the search includes characterizing unstructured information, said characterization including determining information structure based on the nature of the context.

19. A method for performing a search for information pertaining to a search subject, comprising:
characterizing each of a plurality of information sources along a scale from social information to professional information;
receiving a name of a person;
receiving a value indicative of a desired level along a scale from social information to professional information;
performing a search through the plurality of information sources based on the received name of the person;
identifying a plurality of personal candidates from results of the performed search and automatically linking profiles of the same person in different search domains;
selecting a search subject from among the identified plurality of candidates based on user input;
characterizing the results of the search that pertain to the selected search subject along a scale from social information to professional information based the characterization of the information source that each item of search results is found within;
filtering the results of the search that pertain to the selected search subject based on the received value indicative of the desired level along the scale from social information to professional information and the characterization of the search results; and
displaying the filtered search results.

20. The method of claim 19, wherein the information sources are characterized based on user input.

21. The method of claim 19, wherein the information sources are characterized based on ontological analysis.

22. The method of claim 19, wherein the information sources are characterized using heuristics.

23. The method of claim 19, wherein a list of information sources within which search results are found is stored in a local memory and the list of information sources is updated using a background process based on criteria including change to search results, a predetermined intervals of time, or at the request of a user.

24. A system for performing a search for information pertaining to a search subject, comprising:
a crawler server for crawling one or more information sources for information pertaining to one or more persons of interest and assigning each found item of information a serial number representing a particular search subject and value that is indicative of how social and how professional the item of information is;
an information database for storing each item of information along with its corresponding search subject serial number and value; and
a web server for providing a search interface for allowing a user to perform a search for information pertaining to a desired search subject from among the information stored in the information database, wherein search results from the user's search is filtered according to the value of each item of information and a value indicative of a desired level along a scale from social information to professional information provided by the user,
wherein the crawler server, the information database, and the web server are each implemented on one or more computer systems.

25. The system of claim 24, wherein the one or more information sources include social network service websites, proprietary databases, or blogs.

26. A computer program product for performing a search for information pertaining to a search subject, said computer program product comprising:
a non-transitory computer readable storage medium;
program instructions for receiving a name of a person;

program instructions for receiving a value indicative of a desired level along a scale from social information to professional information;

program instructions for performing a search for the received name using a information database storing items of information crawled from one or more information sources along with corresponding search subject name data and value that is indicative of how social and how professional the item of information is;

program instructions for identifying a plurality of personal candidates from results of the performed search;

program instructions for selecting a search subject from among the identified plurality of candidates based on user input;

program instructions for filtering the results of the search that pertain to the selected search subject based on the received value indicative of the desired level along the scale from social information to professional information; and program instructions for displaying the filtered search results, wherein the program instructions are stored on said non-transitory computer readable storage medium.

27. The computer program product of claim 26, comprising, program instructions updating the filtered search results periodically, on the initiation of a user, or as new search results are available and displaying the updated filtered search results along with updated filtered search results pertaining to previous searches on a single user interface screen.

28. The computer program product of claim 26, wherein the value indicative of a desired level along a scale from social information to professional information is provided by a user by adjusting a user interface element.

29. The computer program product of claim 26, wherein the selecting of a search subject from among the identified plurality of candidates based on user input comprises displaying a plurality of matrices, each matrix representing one of the information sources, wherein each of the matrices includes a grid of icons, each icon representing a candidate of the plurality of candidates, wherein each icon is used by the user to display information about the corresponding candidate from the corresponding source of search information, and wherein the user selects a search subject by selecting an icon from one of the matrices.

* * * * *